United States Patent
Ogura et al.

(10) Patent No.: US 6,189,025 B1
(45) Date of Patent: Feb. 13, 2001

(54) METHOD FOR CONTROLLING COMMUNICATION PATHS AND COMMUNICATION CONTROL SYSTEM IN COMMUNICATION NETWORK

(75) Inventors: Takao Ogura; Yasuki Fujii; Kohei Iseda; Takafumi Chujo; Masaaki Ueki, all of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/115,371

(22) Filed: Jul. 14, 1998

(30) Foreign Application Priority Data

Dec. 22, 1997 (JP) .................................... 9-352676

(51) Int. Cl.[7] ...................................... G06F 15/16
(52) U.S. Cl. .................. 709/203; 709/202; 709/223; 709/238; 709/244; 370/408; 370/469
(58) Field of Search .................... 709/202–203, 709/220–221, 223–224, 230–231, 238–239, 242–244; 370/248, 469, 522, 907, 254, 351, 360, 400–401, 408, 420

(56) References Cited

U.S. PATENT DOCUMENTS

| | | | |
|---|---|---|---|
| 5,189,410 | * 2/1993 | Kosugi et al. | 340/825.14 |
| 5,317,568 | * 5/1994 | Bixby et al. | 370/401 |
| 5,436,890 | * 7/1995 | Read et al. | 370/352 |
| 5,651,006 | * 7/1997 | Fujino et al. | 370/408 |
| 5,726,979 | * 3/1998 | Henderson et al. | 370/254 |
| 5,784,567 | * 7/1998 | Sager et al. | 709/231 |
| 5,790,789 | * 8/1998 | Suarze | 709/202 |
| 5,818,845 | * 10/1998 | Moura et al. | 370/449 |
| 5,845,080 | * 12/1998 | Hamada et al. | 709/224 |
| 5,878,212 | * 3/1999 | Civanlar et al. | 709/203 |
| 5,963,556 | * 10/1999 | Varghese et al. | 370/401 |
| 5,974,236 | * 10/1999 | Sherman | 709/221 |
| 5,987,027 | * 10/1999 | Park et al. | 370/360 |

\* cited by examiner

*Primary Examiner*—Ahmad F. Matar
*Assistant Examiner*—Bharat Barot
(74) *Attorney, Agent, or Firm*—Helfgott & Karas, P.C.

(57) ABSTRACT

A communication network comprised of communication paths of server layers formed hierarchically by communication paths of client layers, wherein the state of control of the communication paths of a layer being controlled is independently managed in terms of both (i) an administrative state and (ii) a subordinate state indicating influence from communication paths of a server layer, the administrative state of the communication paths of the layer being controlled is changed according to the control for setting and releasing the communication paths, and the subordinate state of the communication paths of a client layer influenced by the change of the administrative state of the communication paths is changed accordingly. At this time, when a subordinate state has already been influenced by a state of control of the communication paths of a server layer, the processing for management is terminated.

9 Claims, 18 Drawing Sheets

Fig. 1B (1) CROSS CONNECT (XC) OF COMMUNICATION PATH C IS RELEASED

PATH C → COMMUNICATION PATH B → COMMUNICATION PATH A
         (SUBORDINATE LOCKED)        (SUBORDINATE LOCKED)
                                     (LOCKED)

(2) ACCORDING TO ABOVE STATE (1), CROSS CONNECT (XC) OF COMMUNICATION PATH B IS RELEASED.

→ COMMUNICATION PATH B (PATH CONTROL PROCESSING ENDS,
    (LOCKED)            SINCE PATH B HAS ALREADY BEEN SUBORDINATE LOCKED.)
    (SUBORDINATE
     LOCKED)

(3) ACCORDING TO ABOVE STATE (1), CROSS CONNECT (XC) OF COMMUNICATION PATH D IS RELEASED.

→ COMMUNICATION PATH D (PATH CONTROL PROCESSING ENDS,
    (LOCKED)            SINCE PATH C HAS ALREADY BEEN SUBORDINATE LOCKED.)

(4) ACCORDING TO ABOVE STATE (2), CROSS CONNECT (XC) OF COMMUNICATION PATH B IS SET UP AGAIN

→ COMMUNICATION PATH B (PATH CONTROL PROCESSING ENDS,
    (SUBORDINATE        SINCE PATH B HAS ALREADY BEEN SUBORDINATE LOCKED.)
     LOCKED)

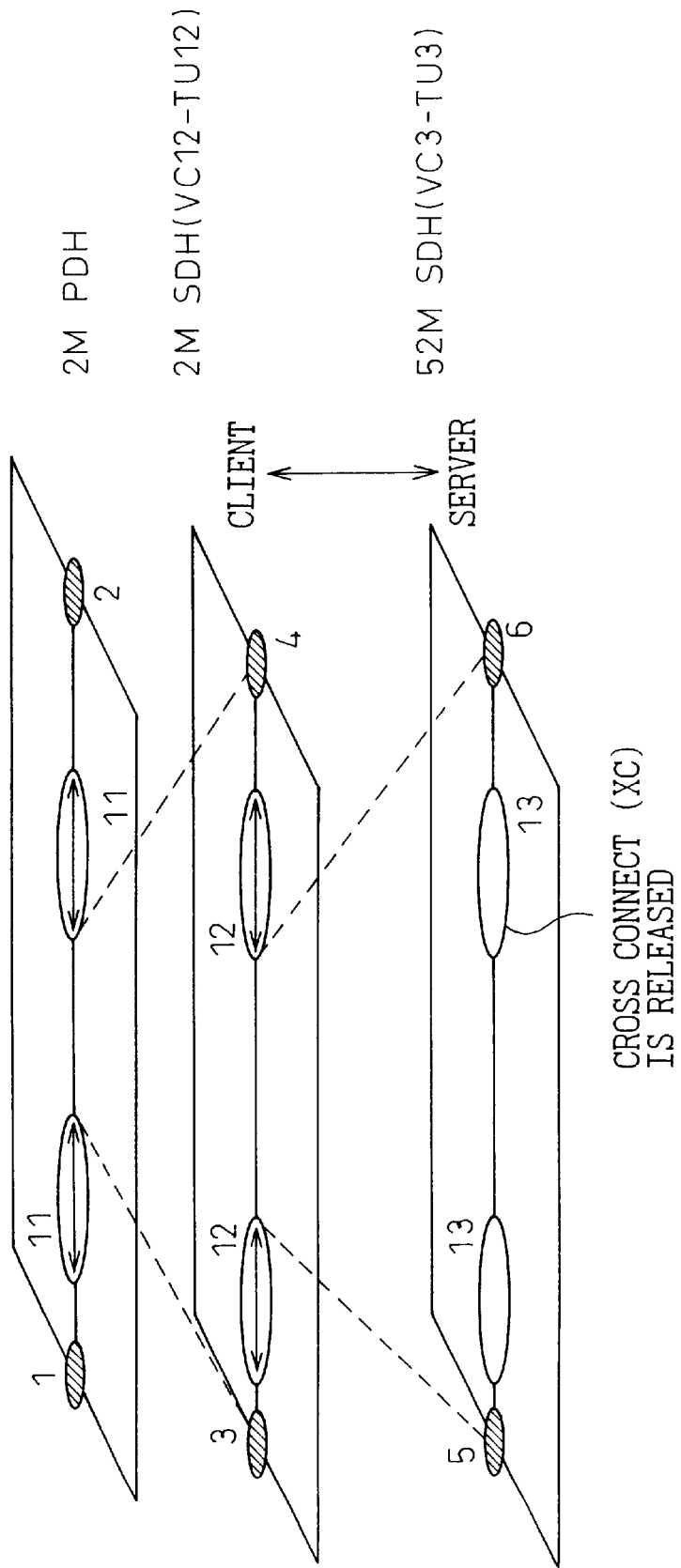

Fig. 3B

| | BEFORE RELEASE OF XC | | AFTER RELEASE OF XC | |
|---|---|---|---|---|
| | ADMINISTRATIVE STATE | SUBORDINATE STATE | ADMINISTRATIVE STATE | SUBORDINATE STATE |
| 2M PDH | UNLOCKED | UNLOCKED | UNLOCKED | LOCKED |
| 2M SDH(VC12-TU12) | UNLOCKED | UNLOCKED | UNLOCKED | LOCKED |
| 52M SDH(VC4-AU4) | UNLOCKED | UNLOCKED | LOCKED | UNLOCKED |

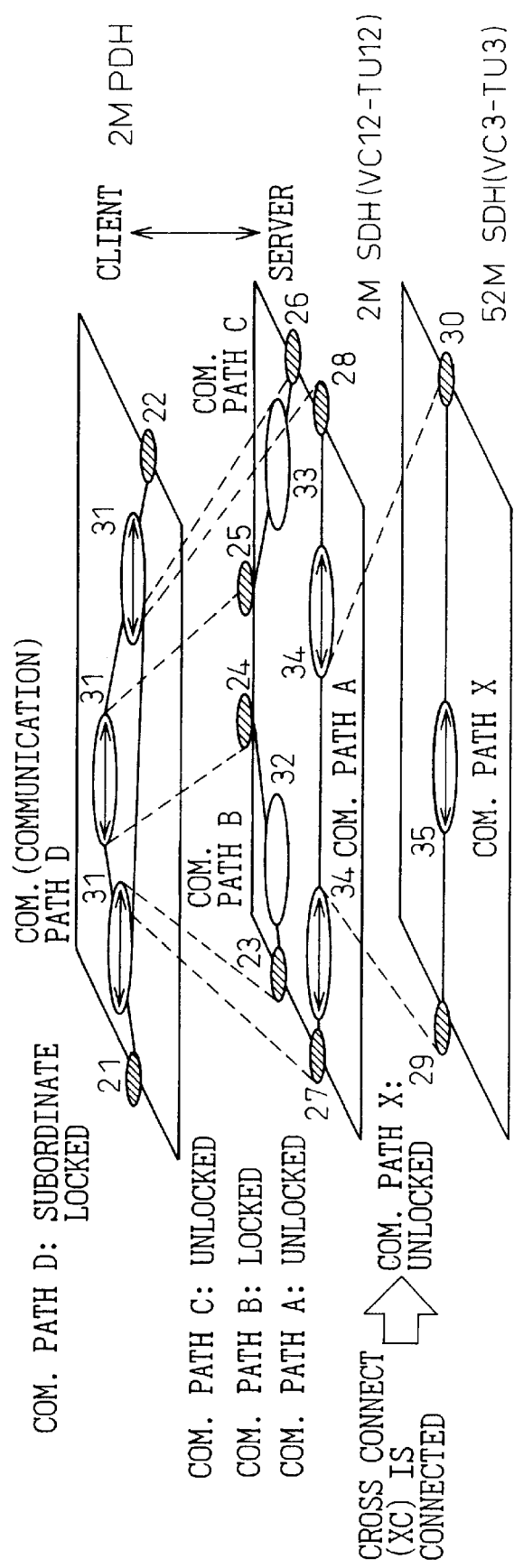

Fig.5B

| | BEFORE SETTING OF XC | | AFTER SETTING OF XC | |
|---|---|---|---|---|
| | ADMINISTRATIVE STATE | SUBORDINATE STATE | ADMINISTRATIVE STATE | SUBORDINATE STATE |
| COM. PATH X | LOCKED | UNLOCKED | UNLOCKED | UNLOCKED |
| COM. PATH A | UNLOCKED | LOCKED | UNLOCKED | UNLOCKED |
| COM. PATH B | LOCKED | UNLOCKED | LOCKED | UNLOCKED |
| COM. PATH C | UNLOCKED | UNLOCKED | UNLOCKED | UNLOCKED |
| COM. PATH D | UNLOCKED | LOCKED | UNLOCKED | LOCKED |

\* COM. =COMMUNICATION

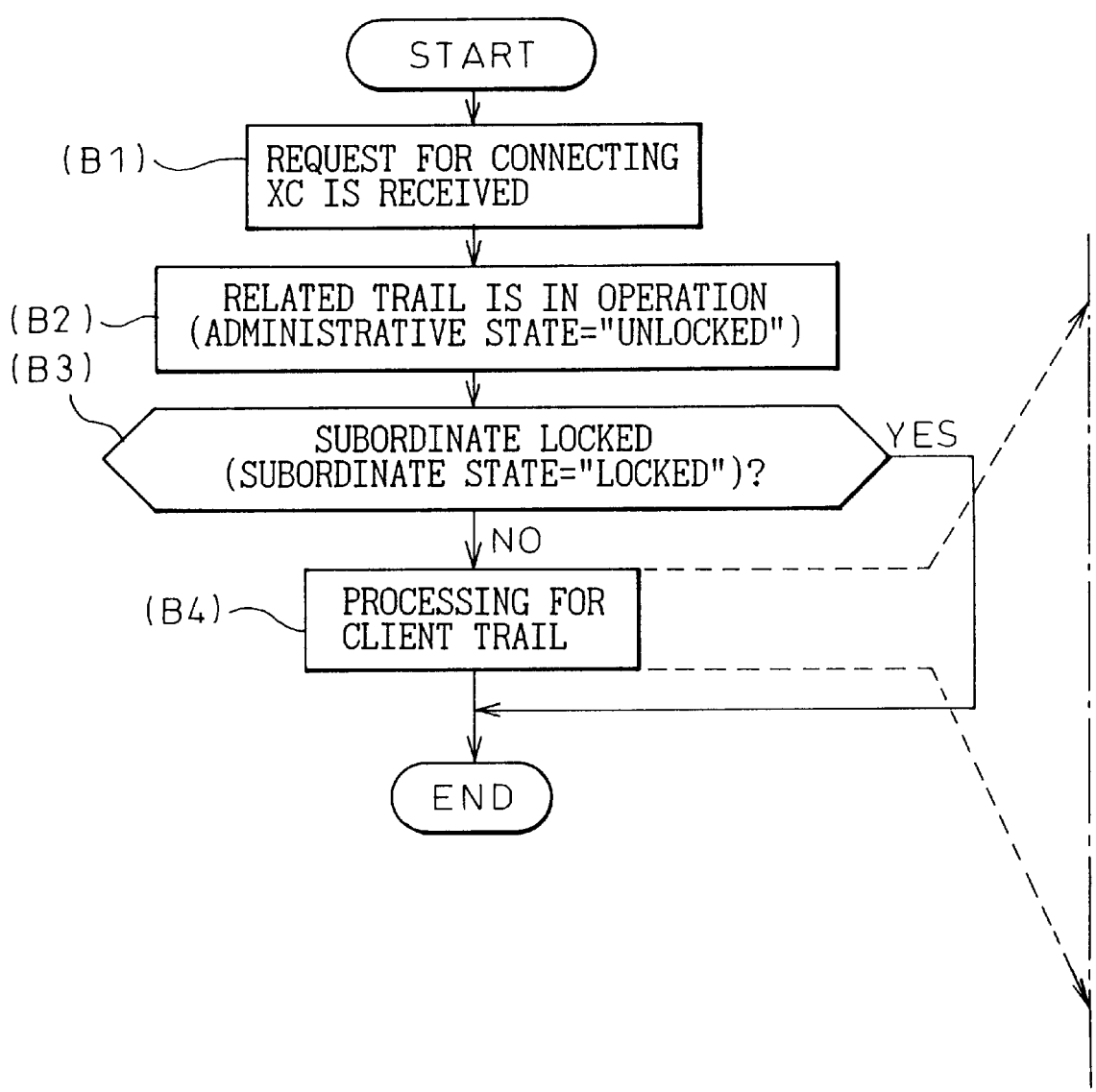

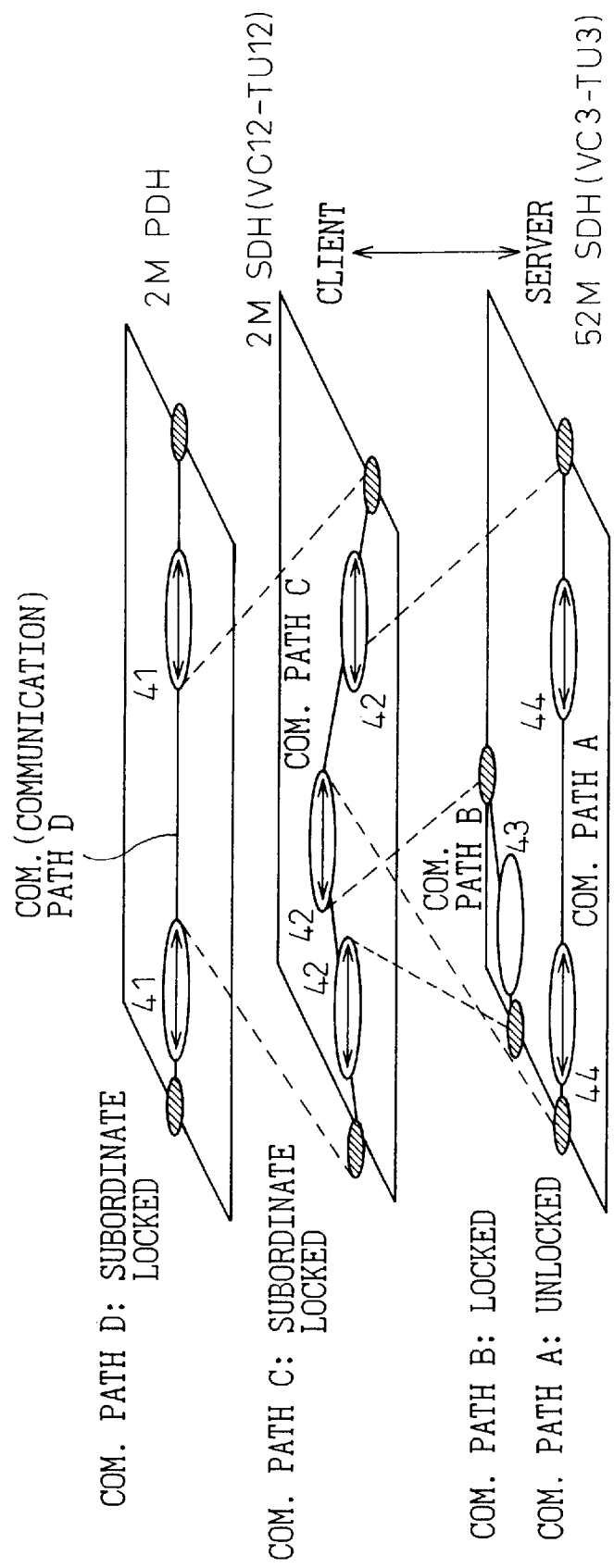

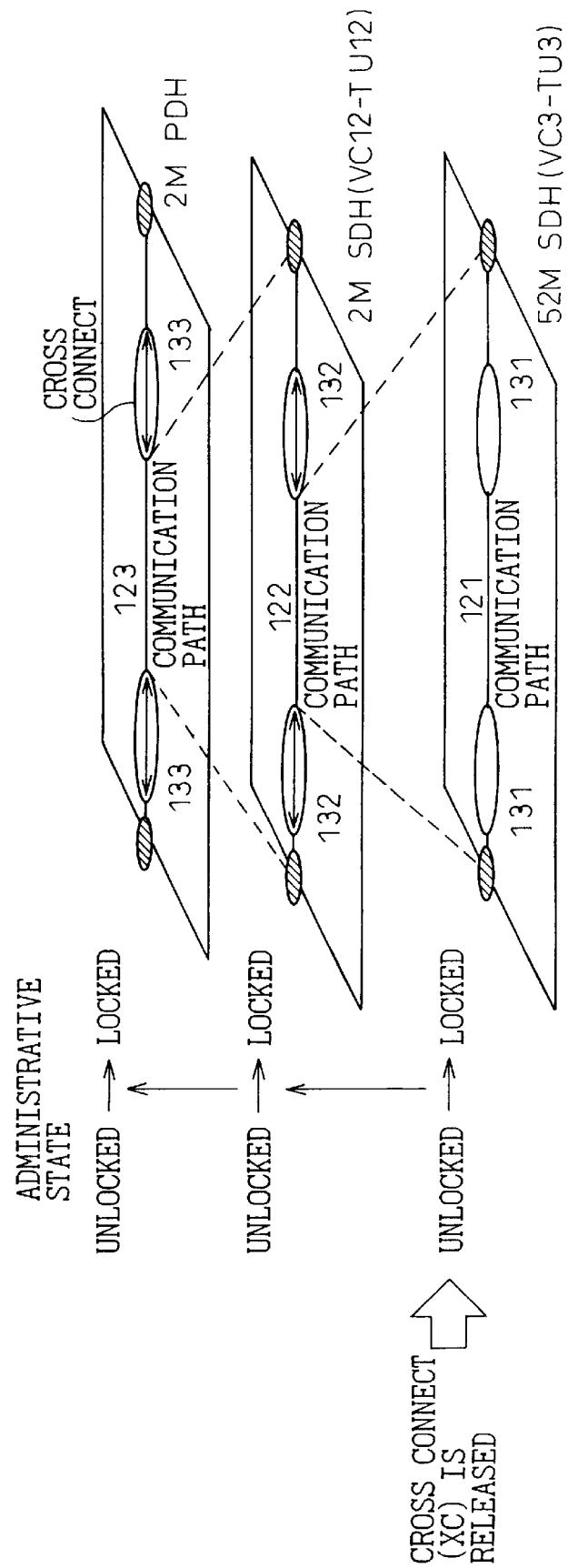

METHOD FOR CONTROLLING COMMUNICATION PATHS AND COMMUNICATION CONTROL SYSTEM IN COMMUNICATION NETWORK

BACKGROUND OF THE INVENTION

1. Field of the Invention Group

The present invention relates to a method for controlling communication paths and a communication control system in a communication network.

A communication network has been becoming more complex and larger in scale as they adapt to handle various configurations of transmission modes and different transmission speeds. In such a communication network, it is necessary to manage the overall operational states of the communication paths in order to facilitate the control for formation and release of communication paths.

2. Description of the Related Art

As mentioned above, a communication network is generally constituted to handle a mixture of modes and speeds. Various transmission modes, for example, the plesiochronous digital hierarchy (PDH), synchronous digital hierarchy (SDH), and asynchronous transfer mode (ATM) are used and various transmission speeds are operated at.

As will be explained in detail later by referring to the drawings, such a communication network is generally managed for the different transmission modes or transmission speeds. For example, the communication paths having a transmission speed of 2 Mbps are managed by first and second sub-network management systems, while communication paths of a transmission speed of 52 Mbps are managed by a third sub-network management system. The overall communications network is managed by a main network management system which functions as a higher level system of these sub-network management systems.

Management of such complex communications networks tends to arrange these communication paths hierarchically as seen for example in Recommendations G.805 of the International Telecommunication Union-Telecommunication Standardization Sector (ITU-T).

In such a communication network, if communication paths are arranged hierarchically, they are hierarchically constituted by, e.g., first SDH communication paths (VC3-TU3)(VC: Virtual Container, TU: Tributary Unit) of 52 Mbps, second SDH communication paths (VC12-TU12) of 2 Mbps, and third PDH communication paths of 2 Mbps. These communication paths have respective cross connects. Namely, a third PDH communication path of 2 Mbps is constituted by part of a first communication path and part of a, second communication path.

Accordingly, when switching a cross connect of a first communication path from an unlocked state (in operational service) to a locked state, even if the cross connect of the second communication path forming part of the first communication path is supposed to be in the unlocked state, the second communication path is changed from the unlocked state to the locked state. Accordingly, also the third communication path forming part of the second communication path switches from the unlocked state to the locked state. In this way, higher level parts of the hierarchical structure influence the lower level parts. It therefore becomes possible to identify the state of a lower level by examining the state of the higher level.

When the cross connect of the third communication path is placed in the unlocked state from the locked state by setting of a path, it is necessary to confirm whether both of the first and second communication paths of the higher levels are in the unlocked state. Namely, when switching a lower level from the locked state to the unlocked state (in operational service) but if a higher level is not in the unlocked state, the communication path of the lower level will not enter operational service. Accordingly, as the number of hierarchies becomes larger, processing for deciding the state for every level has to be repeated and there arises a problem of a longer processing time.

SUMMARY OF THE INVENTION

Therefore, in consideration with the above problem, an object of the present invention is to shorten a processing time for control of communication paths by managing the communications network as a hierarchical structure.

To attain the above object, according to the present invention, there is provided a communication network comprised of communication paths of server layers formed hierarchically by communication paths of client layers, wherein the state of control of the communication paths of a layer being controlled is independently managed in terms of both (i) an administrative state and (ii) a subordinate state indicating influence from communication paths of a server layer, the administrative state of the communication paths of the layer being controlled is changed according to the control for setting and releasing the communication paths, and the subordinate state of the communication paths of a client layer influenced by the change of the administrative state of the communication paths is changed accordingly.

At this time, when a subordinate state has already been changed to the content which corresponds to the content of the administrative state of the communication paths of the server layer, the subordinate state of the communication paths of a client layer is made to be left as it is and the processing for management is ended. By this, the time required for the processing for managing the states of the communication paths and the processing for changing the states of the communication paths is shortened.

BRIEF DESCRIPTION OF THE DRAWINGS

These and other objects and features of the present invention will be more apparent from the following description of the preferred embodiments given with reference to the accompanying drawings, wherein:

FIGS. 3A and 3B are explanatory views of status information used for the control of communication paths according to the embodiment of the present invention;

FIGS. 5A and 5B are explanatory views of status information used for the control of communication paths according to the embodiment of the present invention;

FIGS. 6A and 6B are flowcharts of processing for releasing the lock according to the embodiment of the present invention;

FIG. 7 is a view explaining control of a communication path according to the embodiment of the present invention;

FIG. 13 is a view explaining the operation and locking of paths in the communications network.

DESCRIPTION OF THE PREFERRED EMBODIMENTS

Before describing the embodiments of the present invention, the related art and the disadvantages therein will be described with reference to the related figures.

Figure 12:
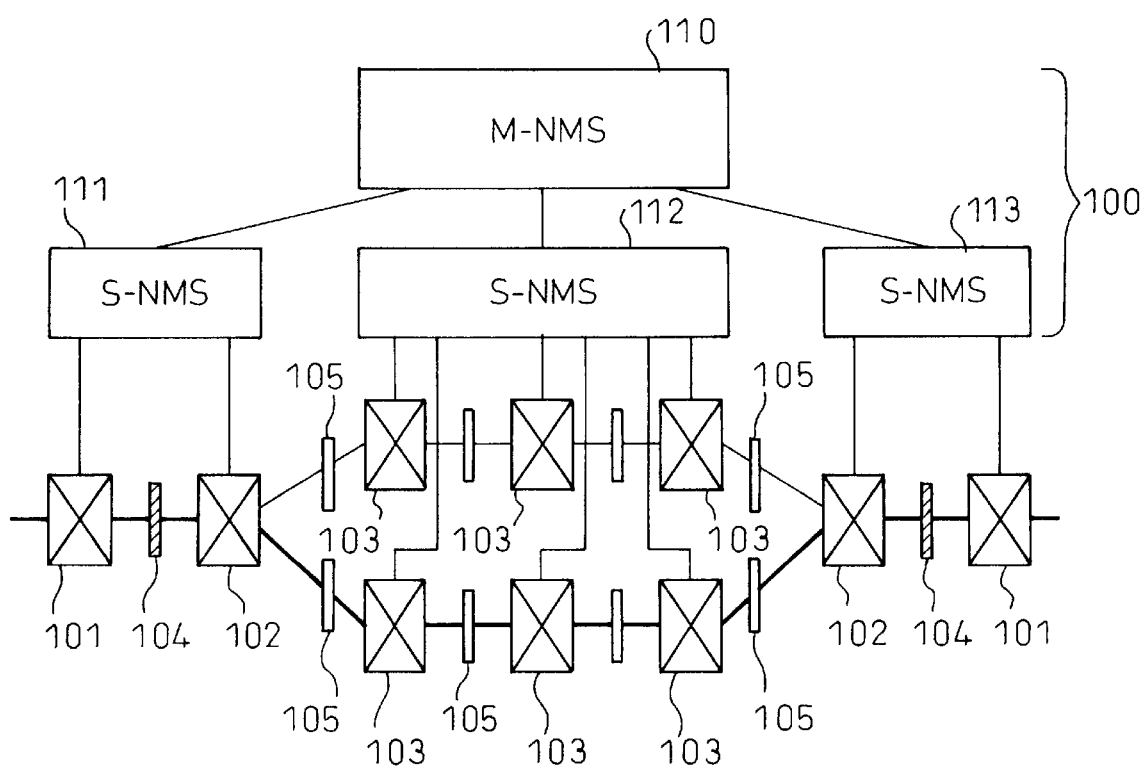
FIG. 12 is an explanatory view of a communications network.

FIG. 12 is an explanatory view of a communications network. In the figure, 101 denotes a PDH cross connect unit of 2 Mbps, 102 an SDH cross connect unit of 2 Mbps, 103 an SDH cross connect unit of 52 Mbps, 104 a PDH-SDH conversion unit, 105 a multiplex/demultiplex unit, 110 a main network management system (M-NMS), and 111 to 113 sub-network management systems (S-NMS). That is, there is a mix of configurations using the PDH and SDH modes and different transmission speeds of 2 Mbps and 52 Mbps. The systems 110 to 113 constitute a communication path control system 100.

As already explained, such a communication network is generally managed for the different transmission modes or transmission speeds. For example, in FIG. 12 the communication paths having a transmission speed of 2 Mbps are managed by sub-network management systems 111 and 113, while communication paths of a transmission speed of 52 Mbps are managed by a sub-network management system 112. The overall communication network is managed by a main network management system 110 which functions as a higher level system of these sub-network management systems 111 to 113.

As already explained, management of such complex communications networks tends to arrange these communication paths hierarchically as seen for example in Recommendations G.805 of the International Telecommunication Union-Telecommunication Standardization Sector (ITU-T).

FIG. 13 is an explanatory view of the operation and locking of paths in a communications network.

In such a communication network, when communication paths are arranged hierarchically, for example, they are hierarchically constituted by SDH communication paths 121 (VC3-TU3)(VC: Virtual Container, TU: Tributary Unit) of 52 Mbps, SDH communication paths 122 (VC12 -TU12) of 2 Mbps, and PDH communication paths 123 of 2 Mbps. These communication paths 121 to 123 have cross connects 131 to 133. Namely, a PDH communication path 123 of 2 Mbps is constituted by part of a communication path 121 and part of a communication path 122.

Accordingly, when switching a cross connect 131 of a communication path 121 from an unlocked state (in operational service) to a locked state, even if the cross connect 132 of the communication path 122 forming part of the communication path 121 is supposed to be in the unlocked state, the communication path 122 is changed from the unlocked state to the locked state. Accordingly, also the communication path 123 forming part of the communication path 122 switches from the unlocked state to the locked state. In this way, higher level parts of the hierarchical structure influence the lower level parts. It therefore becomes possible to identify the state of a lower level by examining the state of the higher level.

When the cross connect 133 of a communication path 123 is placed in the unlocked state from the locked state by setting of a path, it is necessary to confirm whether both of the communication paths 121 and 122 of the higher levels are in the unlocked state. Namely, when switching a lower level from the locked state to the unlocked state (in operational service) but if a higher level is not in the unlocked state, the communication path of the lower level will not enter operational service. Accordingly, as the number of hierarchies becomes larger, processing for deciding the state for every level has to be repeated and there arises the above problem of a longer processing time.

The method for controlling communication paths of the present invention, which is capable of shortening the processing time by managing the communication network as a hierarchical structure, is a method applied to a communication network comprised of communication paths of client layers and communication paths of server layers comprised of these client layer communication paths arranged hierarchically and the method comprises a first process of managing a state of control of the communication paths of a layer being controlled in terms of an administrative state and a subordinate state which is influenced by the state of the communication paths of the server layer independently from the administrative state, and a second process of changing the administrative state of the communication paths of the layer being controlled according to a control for setting and releasing the communication paths, and changing the subordinate state of the communication paths of a client layer which subordinate state is to be changed by the change of the administrative state of the communication paths.

It may further include a process of leaving the subordinate state of the communication paths in a client layer as it is, and ending the processing for control of the communication paths when the subordinate state of the communication paths of a client layer, which is influenced by the control for setting and releasing the communication paths, has already been changed to the content which corresponds to the content of the administrative state of the communication paths in the server layer. For example, when releasing communication paths, if the subordinate state of the communication paths of a client layer is the locked state, the communication paths of the other client layers which are influenced by the control of the communication paths are already in the subordinate locked state, therefore no further processing is carried out.

It may further include a process of changing the administrative state of the communication paths to the locked state at the time of occurrence of a fault in the communication paths, terminating the processing for control of communication paths when the subordinate state of the communication paths of a client layer which is influenced by the change of the administrative state of the communication paths is the locked state, and changing the subordinate state to the locked state when not the locked state. Accordingly, it becomes possible to easily search for communication paths available for operational service based on the administrative state and the subordinate state.

Further, a communication control system of the present invention is one for controlling a communications network comprising communication paths of client layers and communication paths of server layers comprising those communication paths arranged hierarchically and is provided with a trail control function unit for managing the communication paths of each layer by the administrative state and subordinate state, changing the administrative state of the communication paths due to control for setting and releasing the communication paths of the layer being controlled, and changing the subordinate state of the communication paths of a client layer which is influenced by the change of the administrative state of the communication paths.

It may further be constituted by a plurality of sub-network management systems for collecting status information and transferring control information with units of the communication network and a main network management system for transferring the status information and control information with the plurality of sub-network management systems and having the trail control function unit in it.

Figure 1:
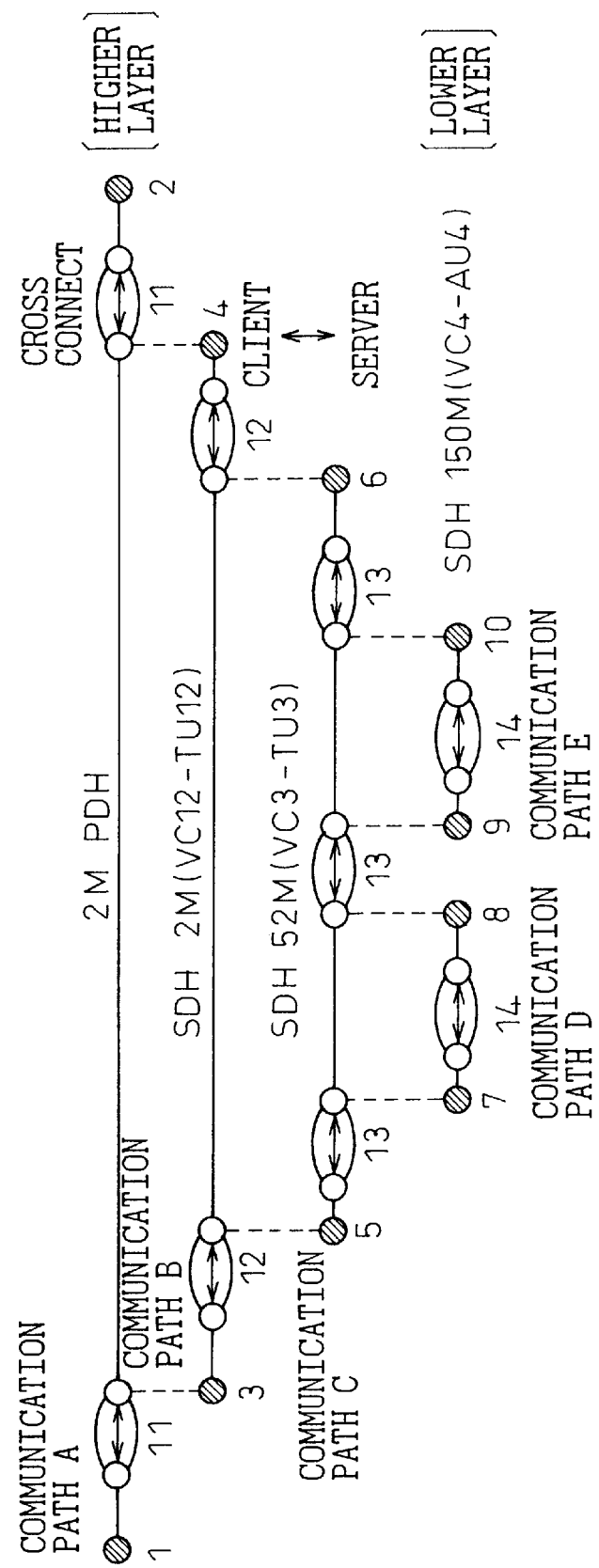
FIGS. 1A and 1B are views explaining briefly a control of communication paths according to an embodiment of the present invention.
Figure 2:
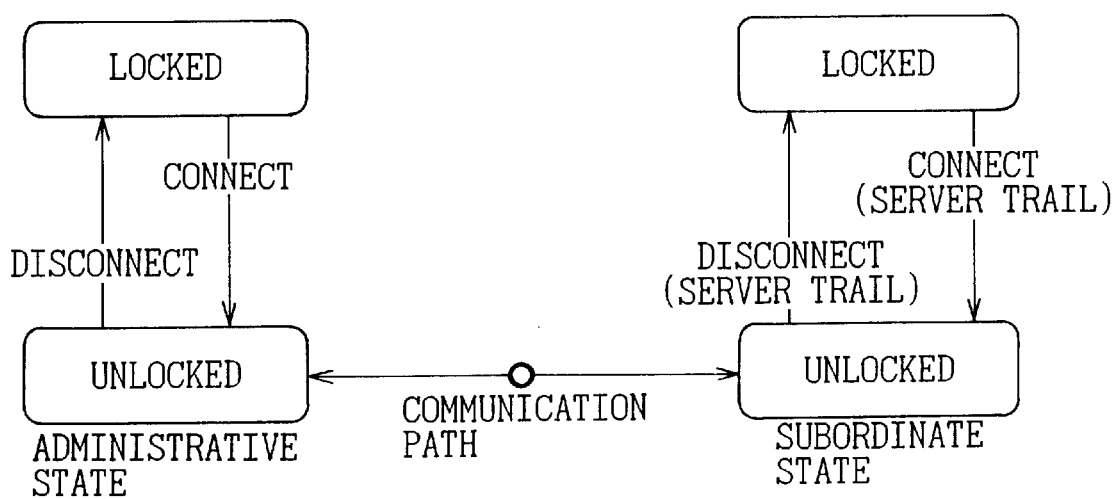
FIG. 2 is a view explaining a transition of state of communication paths according to the embodiment of the present invention.

FIGS. 1A and 1B are views briefly explaining the control of communication paths according to the embodiment of the present invention. In FIG. 1A, 1 and 2 denote termination units of a 2 Mbps 2 M PDH communication path A, 3 and 4 denote termination units of a 2 Mbps 2 M SDH communication path B (VC12-TU12), 5 and 6 denote termination units of a 52 Mbps 52 M SDH communication path C (VC3-TU3), 7, 8, 9, and 10 denote termination units of 150 Mbps 150 M SDH communication paths D and E (VC4-AU4), and 11 to 14 denote cross connects.

For the communication paths A, B, C, D, and E of the hierarchical structure, the main management system 110 defines a higher level as a "server" and a lower level as a "client" and manages communication paths by the administrative state and the subordinate state of the same. The "administrative state" is defined by a state based on the control for setting and releasing communication paths, while the "subordinate state" is defined by the state of communication paths of a client layer which is influenced by the state of control of the communication paths of a server layer. The system 100 independently manages this administrative state and subordinate state.

In (1) of FIG. 1B, when the XC of the communication path C is released, that is, when the cross connect 13 of the communication path C is controlled to the locked state, the administrative state of this communication path C is the locked state, the subordinate state of the communication path B, i.e., the client layer of this communication path C is the locked state (subordinate locked), and the subordinate state of the communication path A, i.e., the client layer of this communication path B is the locked state (subordinate locked).

Further, in (2) of FIG. 1B, when the XC of the communication path B is released due to the state of the above (1), that is, when the cross connect 12 is switched from the unlocked state to the locked state, the administrative state of the communication path B of the layer being controlled is changed to the locked state. In this case, since the subordinate state is already the locked state, the processing in this case is terminated.

Further, in (3) of FIG. 1B, when the XC of the communication path D is released due to the state of the above (1), that is, when the cross connect 14 is switched from the unlocked state to the locked state, the administrative state of the communication path D of the layer being controlled is changed from the unlocked state to the locked state. Then, since the subordinate state of the communication path C, i.e., the client layer for the communication path D is already the locked state, the processing is terminated.

Further, in (4) of FIG. 1B, when the XC of the communication path B is set again due to the state of the above (2), that is, when the cross connect 12 is switched from the locked state to the unlocked state (when setting paths), the administrative state of the communication path B of the layer being controlled is made the unlocked state. At this time, the subordinate state thereof is the locked state, therefore it cannot be changed to the unlocked state (operational service state) and the processing is terminated.

FIG. 2 is an explanatory view of the status transition of communication paths according to the embodiment of the present invention. In the figure, the formed communication paths are managed in terms of the administrative state. The subordinate state independently "LOCKED" indicates the locked state, and "UNLOCKED" indicates the unlocked state, that is, the state when in operational service.

When viewing the administrative state, it indicates that a network control has been executed directly to the communication path. Namely, a change of the administrative state from the locked state "LOCKED" to the unlocked state "UNLOCKED", indicates that the cross connect of the layer for the communication path changes from a disconnected state "DISCONNECT" to a connected state "CONNECT." On the other hand, a change of the administrative state from the unlocked state "UNLOCKED" to the locked state "LOCKED" indicates that the cross connect of the layer for the communication path changes from a connected state "CONNECT" to a disconnected state "DISCONNECT".

When viewing the subordinate state, it changes to the unlocked state "UNLOCKED" due to the connected state "CONNECT" of a server trail, i.e., the communication path of the server layer, and changes to the locked state "LOCKED" due to the disconnected state "DISCONNECT" of the server trail. Namely, the administrative state of the communication paths of the layer being controlled is changed according to the control for setting and releasing that path, and the subordinate state thereof is changed according to the control of the communication paths of the server layer.

FIGS. 3A and 3B are explanatory views of status information used for the control of communication paths according to the embodiment of the present invention. The same reference numerals as those of FIG. 1 indicate the same parts. FIG. 3A shows network layers and indicate 2 Mbps 2 M PDH communication paths having cross connects 11 between termination units 1 and 2, 2 Mbps 2 M SDH communication paths (VC12-TU12) having cross connects 12 between termination units 3 and 4, and 52 Mbps 52 M SDH communication paths (VC3-TU3) having cross connects 13 between termination units 5 and 6. FIG. 3B shows their status information.

Accordingly, as shown in FIG. 3B, before release of XC, that is, where the cross connects 11 to 13 are in the connected state, the communication paths are in the unlocked state "UNLOCKED". Namely, the communication paths are in operational service. Then, when the cross connects 13 of the layer being controlled are switched from the unlocked state to the locked state, as indicated as "AFTER RELEASE OF XC" in FIG. 3B, the 52 M SDH communication paths (VC3-TU3) containing the cross connects 13 change in their administrative state to the locked state "LOCKED", and 2 M SDH (VC12-TU12) and 2 M PDH communication paths, i.e., the client layers change in their subordinate state to the locked state "LOCKED".

In this state, when control is performed for switching the cross connects 12 from the unlocked state to the locked state, the system 110 changes the administrative state of the 2 M SDH (VC12-TU12) communication paths to the locked state "LOCKED". In this case, since the subordinate state is the locked state "LOCKED", the processing for path control for the client layers is not carried out and the processing is terminated.

Figure 4A:
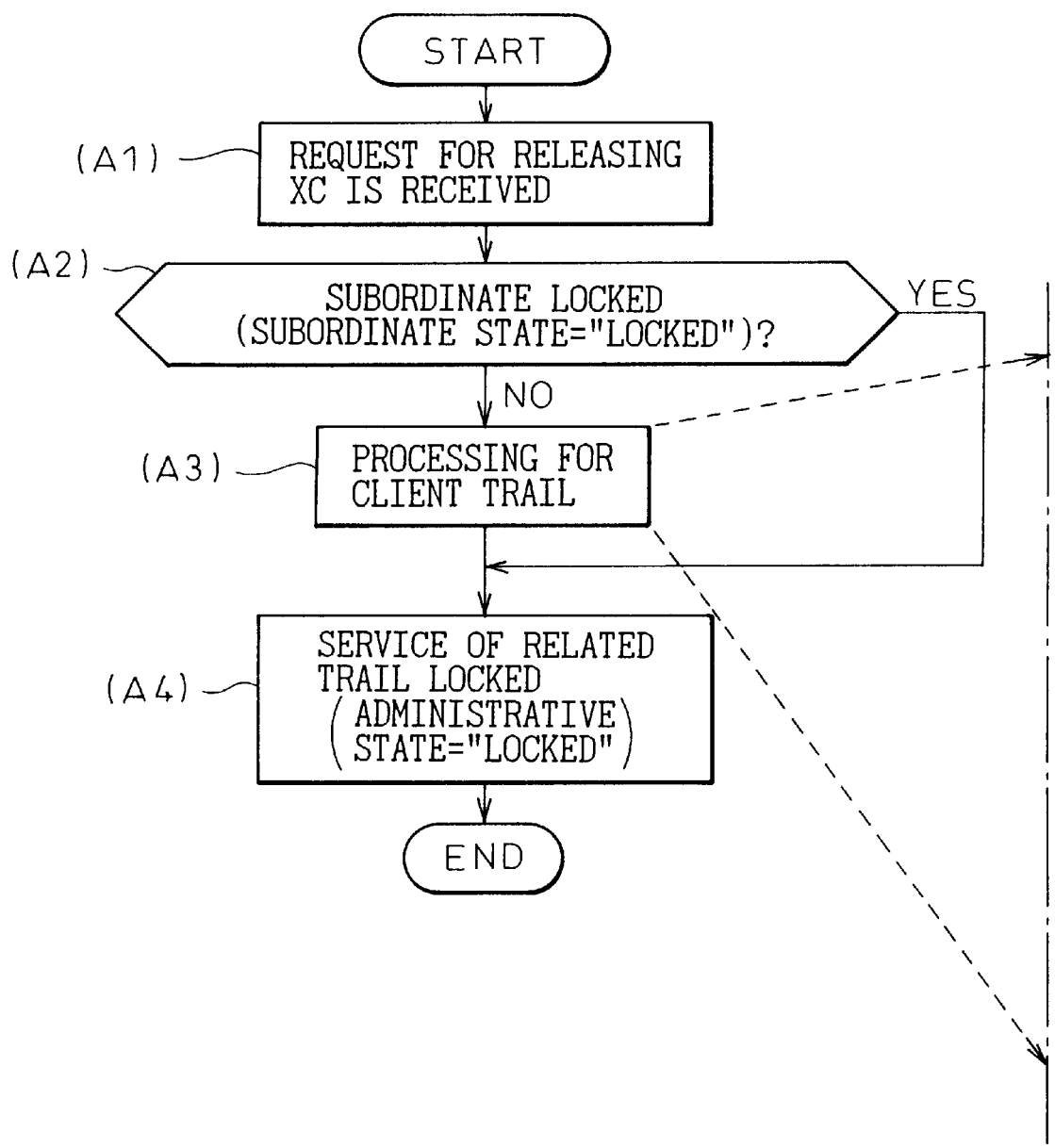
FIGS. 4A and 4B are flowcharts of processing for locking control according to the embodiment of the present invention.
Figure 4B:
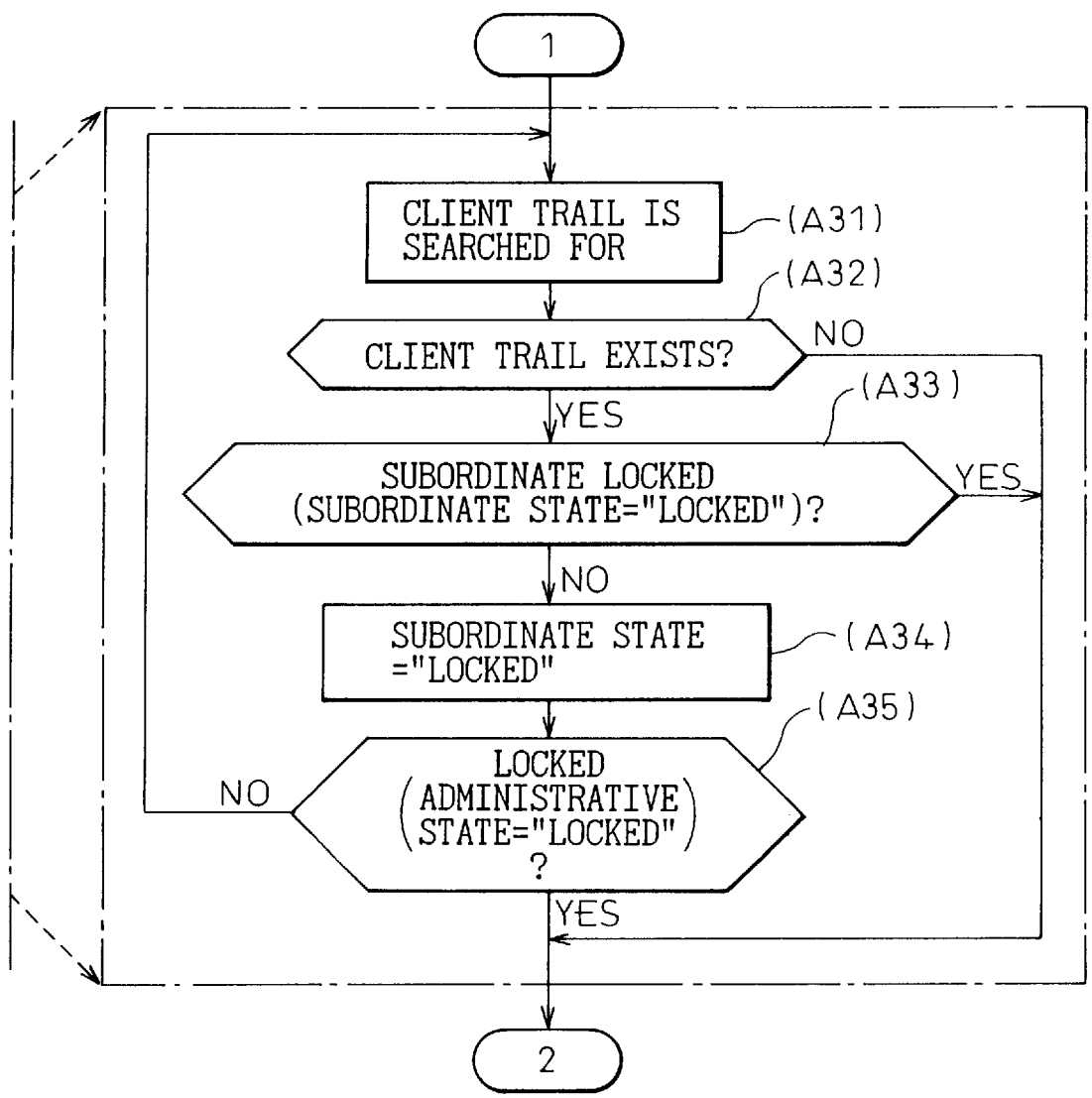

FIGS. 4A and 4B are flowcharts of the processing for the locking control according to the embodiment of the present invention. By an XC release request, that is, a request of path release of cross connects (A1), it is judged whether or not a "subordinate lock" is in effect, that is, whether or not the subordinate state is the locked state "LOCKED" (A2). Where the subordinate state is the locked state "LOCKED", the related trail service is locked, that is, the administrative state of the communication paths of the layer being controlled is made the locked state "LOCKED" (A4).

Further, when the subordinate state is not the locked state "LOCKED" at step (A2), client trail processing is carried out (A3). This step (A3) is for searching for the client trail as shown in FIG. 4B (A31). Namely, existence of a communication path of the client layer which is influenced by the state of control of the communication paths of the server layer is searched for to judge whether or not the communication path of this client layer, that is, the client trail, exists (A32).

When the client trail does not exist, the operation routine shifts to step (A4), while when the client trail exists, it is judged whether or not a subordinate lock is in effect (A33). Namely, it is judged whether or not the subordinate state is the locked state "LOCKED". When a subordinate lock is in effect, the operation routine shifts to step (A4), while when a subordinate lock is not in effect, the subordinate state is changed to the locked state "LOCKED" (A34). It is then judged whether a locked state is in effect, that is, whether the administrative state is the locked state "LOCKED" (A35). In the case of a locked state, the operation routine shifts to step (A4).

At this step (A4), the administrative state of the related trail is set to the locked state "LOCKED", and the processing for control of communication paths is terminated. Further, where a locked state is not in effect at (A35), the operation routine shifts to step (A31), at which the processing for control of communication paths for the communication paths of other client layers, that is, client trail processing, is continued.

FIGS. 5A and 5B are explanatory views of status information used for the control of communication paths according to the embodiment of the present invention. FIG. 5A shows network layers, and FIG. 5B shows the status information corresponding to communication paths. Further, 21 to 30 denote termination units, and 31 to 35 denote cross connects. The figures show a case where the cross connect 35 is switched from the locked state to the unlocked state, in the 2 M PDH communication path D between termination units 21 and 22, the 2 M SDH communication paths A, B, and C (VC12-TU12) between termination units 23 and 24, between 25 and 26, and between 27 and 28, and the 52 M SDH communication path X (VC3-TU3) between termination units 29 and 30.

Namely, like the status information before setting XC shown in FIG. 5B, in the communication path X, the cross connect 35 is the locked state "LOCKED". Further, since there is no server layer with respect to this communication path X, the subordinate state is the unlocked state "UNLOCKED". Further, the subordinate state of the communication path A which is the client layer of the communication path X becomes the locked state "LOCKED".

Further, the subordinate state of the communication path B is the unlocked state "UNLOCKED", but since the cross connect 32 is made the locked state, the administrative state of the communication path B has become the locked state "LOCKED". Further, both of the administrative state and subordinate state of the communication path C have become the unlocked state "UNLOCKED" by making the cross connect 33 the unlocked state. Accordingly, even if the cross connect 31 is set to the unlocked state, since the administrative state and subordinate state of the communication paths B, A, and X corresponding to the server layers of the layer of the cross connect 31 have become the locked state "LOCKED", the subordinate state of the communication path D becomes the locked state "LOCKED".

In such a state, if the cross connect 35 is switched from the locked state "LOCKED" to the unlocked state "UNLOCKED" to set the communication path X, as indicated in "AFTER SETTING OF XC" in FIG. 5B, the administrative state of the communication path X becomes the unlocked state "UNLOCKED". By this, the subordinate state of the communication path A is changed from the locked state "LOCKED" to the unlocked state "UNLOCKED". Further, when the cross connect 32 is kept in the locked state as it is, both the administrative state and the subordinate state of each of the communication paths B, C, and D become states similar to those before setting XC in FIG. 5B.

Figure 6B:
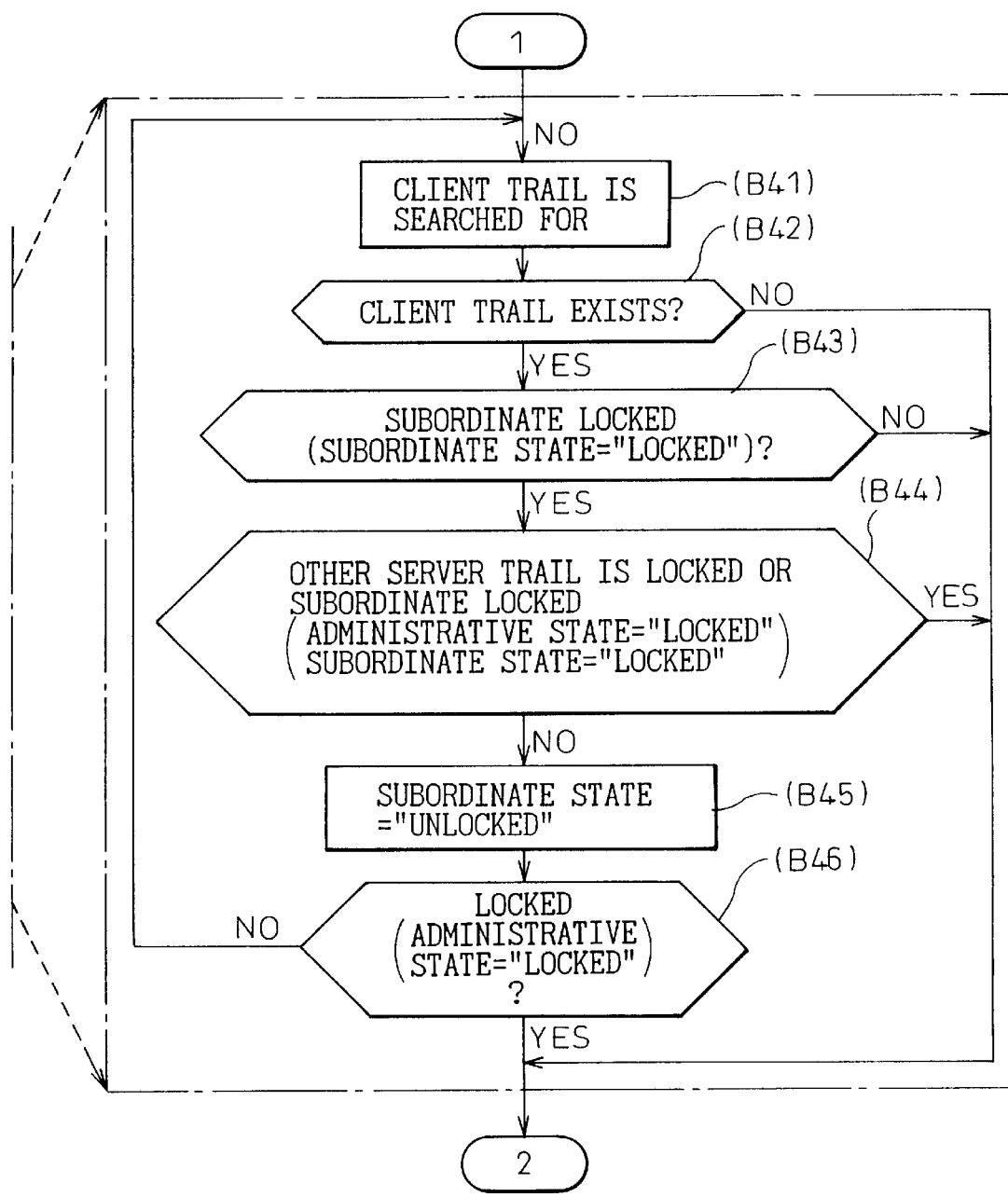

FIGS. 6A and 6B are flowcharts of the processing for releasing the lock according to the embodiment of the present invention. If there is an XC connection request, that is, a connection request for the cross connect (B1), the system 110 enters a related trail operation, that is, makes the administrative state the unlocked state "UNLOCKED" (B2) and judges whether or not a subordinate lock is in effect (B3). Namely, it judges whether or not the subordinate state has become the locked state "LOCKED". When a subordinate lock is in effect, the processing for control of the communication paths is terminated. Namely, since the trail has become locked due to the influence of the server layer, even if the cross connect is controlled so as to set the communication paths of the layer being controlled, the communication paths of the server layer are disconnected. This means that the communication paths for the operational service cannot be formed.

Further, where the subordinate state is not the locked state "LOCKED", the system 110 performs client trail processing (B4). This client trail processing is for searching for the client trail as shown in FIG. 6B (B41), judging whether or not the client trail exists (B42), and terminating the processing when it does not exist.

When the client trail exists, the system 110 judges whether or not the client trail is subordinate locked (B43). Namely, it judges whether or not the subordinate state of the client trail is the locked state "LOCKED". When not subordinate locked, it terminates the processing for control of the communication paths. When subordinate locked, it judges whether or not the other server trails are locked or subordinate locked (B44). Namely, it judges whether or not the administrative state is the locked state "LOCKED" and the subordinate state is the locked state "LOCKED".

When the other server trails are locked or subordinate locked, the system 110 terminates the processing for the control of the communication paths. In other cases, it changes the subordinate state to the unlocked state "UNLOCKED" (B45), judges whether or not the administrative state is the locked state "LOCKED", and, when it is not the locked state, shifts the operation routine to step (B41), and continues the processing for the other client layers, while, when the locked state, terminates the processing.

FIG. 7 is a view explaining the control of communication paths according to the embodiment of the present invention. Reference numeral 41 denotes a cross connect of the 2 M PDH communication path D, 42 denotes a cross connect of the 2 M SDH (VC12-TU12) communication path C, and 43 and 44 denote cross connects of the 52 M SDH (VC3-TU3) communication paths B and A.

When the system 110 sets the cross connect 43 to the locked state and sets the cross connects 41, 42, and 44 to the unlocked state, the communication path A can be set to the unlocked state, i.e., placed in operational service, but the communication paths C and D are influenced by the communication path B of the server layer and become subordinate locked.

In this state, when the system 110 performs control for setting the cross connect 42 to the locked state, the administrative state of the communication path C is set to the locked state "LOCKED". At this time, the subordinate state of the communication path C has become the locked state "LOCKED", therefore the processing for control of the communication paths is terminated.

In the state of FIG. 7, when the system 110 switches the cross connect 43 of the communication path B from the locked state to the unlocked state, the subordinate lock of the communication path C, i.e., the client layer which is influenced by the state of control state of this communication path B is released. Due to the release of the subordinate lock of the communication path C, the subordinate lock of the communication path D, i.e., the client layer of the communication path C is also released.

Figure 8:
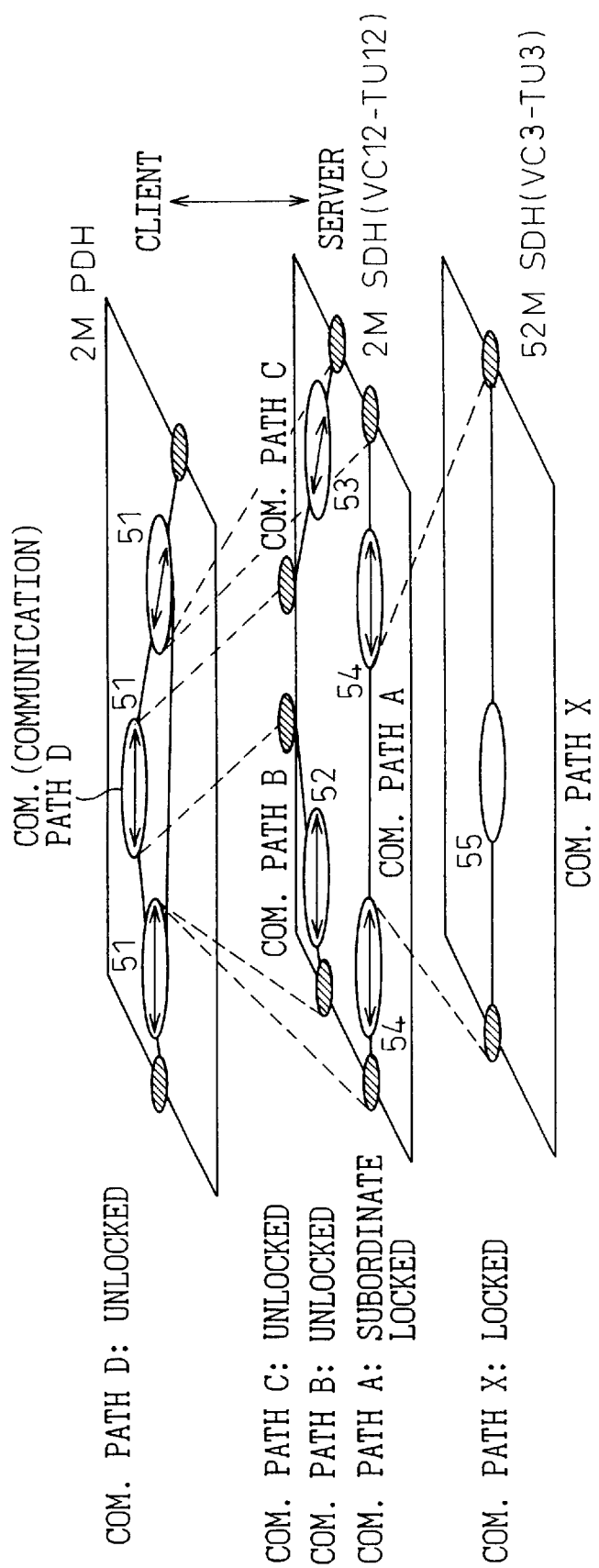
FIG. 8 is another view explaining control of a communication path according to the embodiment of the present invention.

FIG. 8 is a view explaining the control of the communication paths according to the embodiment of the present invention. Reference numeral 51 denotes a cross connect of the 2 M PDH communication path D, 52 to 54 denote cross connects of the 2 M SDH (VC12-TU12) communication paths B, C, and A, and 55 denotes the 52 M SDH (VC3-TU3) cross connect of the communication path X.

The figure shows a case where the cross connect 55 is set to the locked state. By this, the administrative state of the communication path X becomes the locked state "LOCKED", and the communication path A becomes subordinate locked, that is, the subordinate state becomes the locked state "LOCKED". At this time, both of the communication paths B and C are the unlocked state "UNLOCKED". These B and C constitute the server layer of the communication path D in parallel to the communication path A. Therefore, the communication path D becomes the unlocked and enters operational service.

Figure 9:
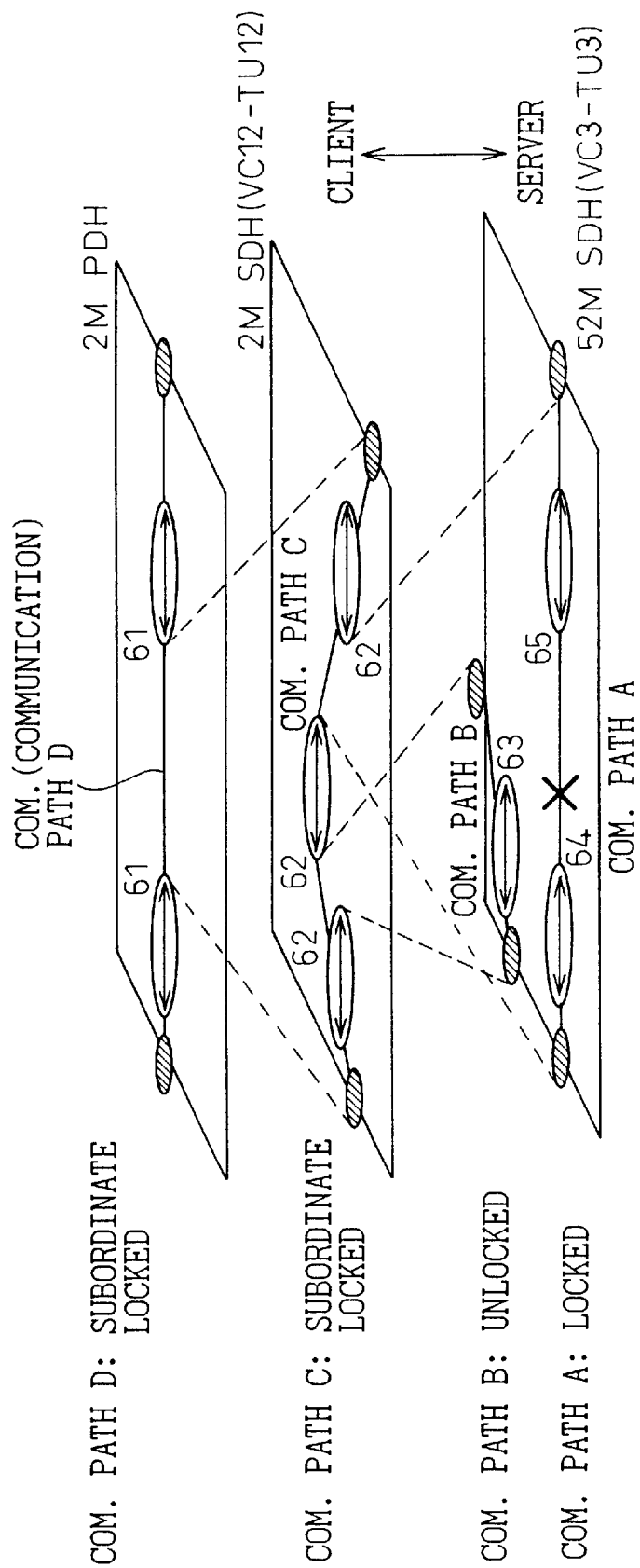
FIG. 9 is a view explaining control at the time of occurrence of a fault according to the embodiment of the present invention.

FIG. 9 is a view explaining the control at the time of occurrence of a fault according to the embodiment of the present invention. Reference numeral 61 denotes a cross connect of the 2 M PDH communication path D, 62 denotes a cross connect of the 2 M SDH (VC12-TU12) communication path C, and 63 to 65 denote cross connects of the 52 M SDH (VC3-TU3) communication paths B and A.

When the system 110 sets the cross connects 61 to 65 to the unlocked state, the communication paths A, B, C, and D enter operational service. In this state, when assuming that a fault occurs between the cross connects 64 and 65 in the communication path A, the communication path becomes locked. Even if the communication path B is in operational service, the communication paths C and D become subordinate locked. Accordingly, processing for setting a subordinate lock can be similarly carried out even at the occurrence of a fault and therefore the search for the communication paths which can be placed into operation at this time becomes easy and, for example, processing for connecting a by-pass route becomes easy.

Figure 10:
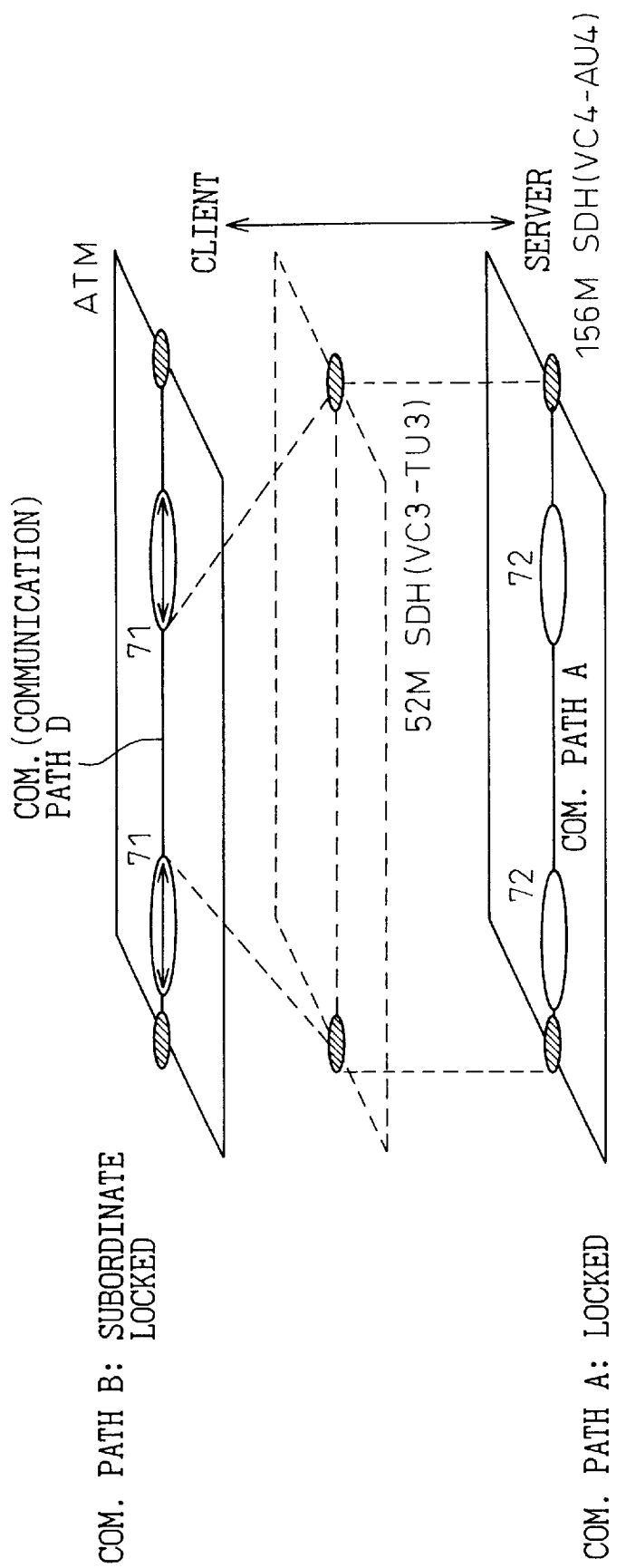
FIG. 10 is a view explaining control of a communication path according to the embodiment of the present invention.

FIG. 10 is a view explaining the control of communication paths according to the embodiment of the present invention. Reference numeral 71 denotes a cross connect of the ATM (Asynchronous Transfer Mode) communication path D, and 72 denotes a cross connect of a 156 M SDH (VC4-AU4) communication path. In this case, the network is one in which no cross connect is provided in the 52 M SDH (VC3-TU3) communication path. Therefore, management of the status information as mentioned above, by the system 100, is not carried out for this layer (indicated by a broken line in the figure).

Accordingly, assuming that the cross connect 72 is in for example the locked state, the system 110 will set the communication path D to a subordinate lock. Further, in this subordinate lock state, when the cross connect 71 is set to the unlocked state, if switching the cross connect 72 from the locked state to the unlocked state, the communication path D is released from the subordinate lock and enters operational service. In this way, in a communications network of a hierarchical structure, the system 110 can omit the management of the administrative state and subordinate state of the communication paths, that is, the control of the communication paths, for layers for which the subordinate state does not have to be managed.

Figure 11:
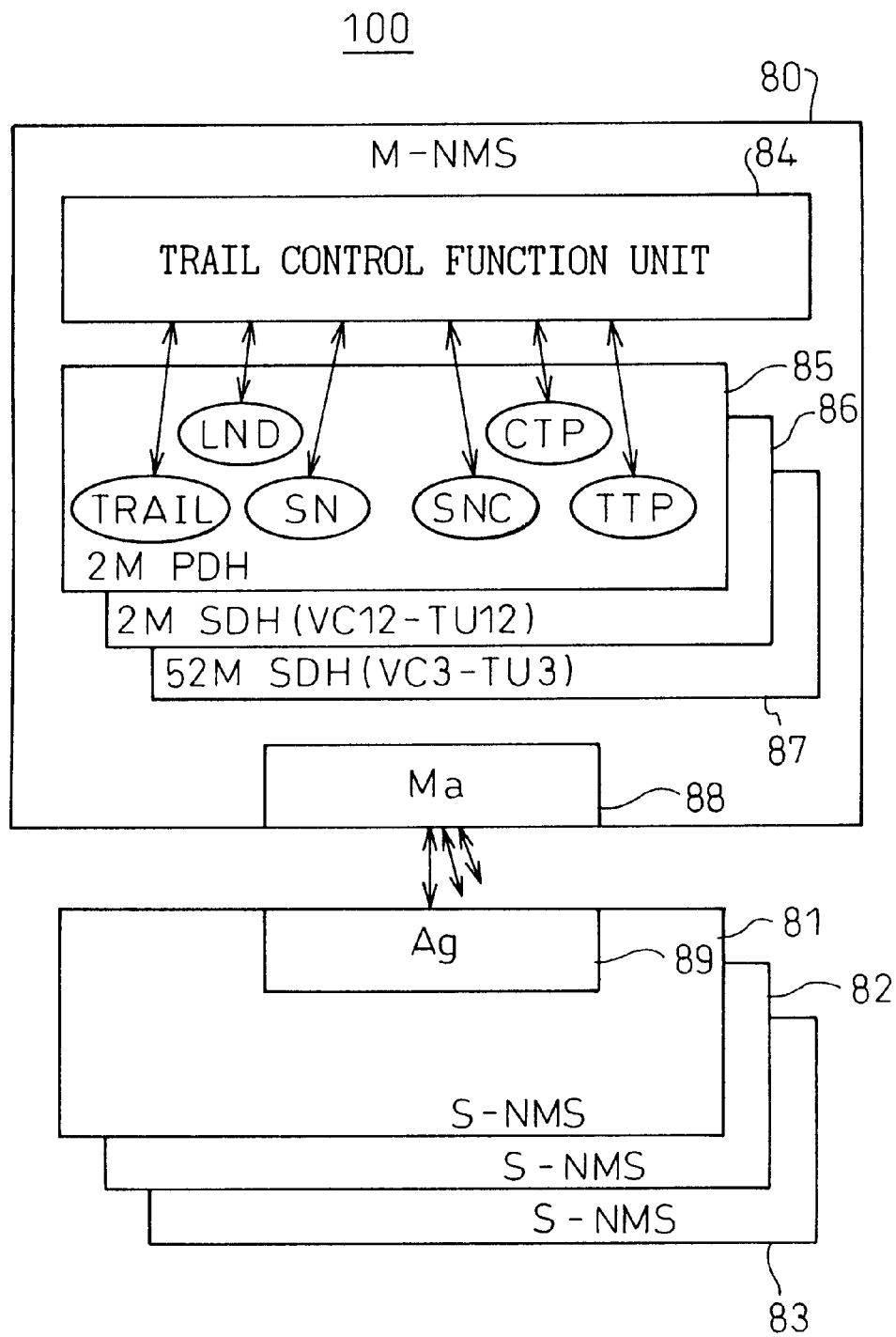
FIG. 11 is an explanatory view of a communication control system according to the embodiment of the present invention.

FIG. 11 is an explanatory view of the communication control system 100 according to the embodiment of the present invention, in which 80 denotes the main network management system (M-NMS), 81 to 83 denote sub-network management systems (S-NMS), 84 denotes a trail control functional unit, 85 to 87 denote layer corresponding units, and 88 and 89 denote communication corresponding units. The main network management system 80 and the sub-network management systems 81 to 83 correspond to the main network management system 110 and the sub-network management systems 111 to 113 in the communications network of FIG. 12.

Further, between the main network management system 80 and the plurality of sub-network management systems 81 to 83, the status information is collected and control information is transferred via the communication corresponding units 88 and 89 by using a manager (Ma) and agent (Ag) as interfaces. Further, the main network management system 80 contains the trail control function unit 84, functional objects for controlling the communications network etc. and information objects for managing the state of each communication path. The case is shown where such information objects, such as TRAIL, LND (Layer Network Domain), SN (Sub-Network), SNC (Sub-Network Connection), CTP (Connection Termination Point), and TTP (Trail Termination Point), exist in units of layers (2 M PDH, 2 M SDH (VC12-TU12), 52 M SDH (VC3-TU3), etc.). Further, it is also possible to constitute the same so that the functional objects exists in units of layers, or it is also possible to share them, as shown in FIG. 11.

The communication paths are managed by the TRAIL object among the information objects. Here, both of the administrative state and the subordinate state are managed as attributes of the TRAIL object. Other attributes of the TRAIL object are a trail identifier TID, operational state, directionality, etc.

Further, the trail control functional unit 84 is a functional unit for controlling the service and locking of communication paths and performs for example processing according to the flowcharts shown in FIGS. 4A and 4B or FIGS. 6A and 6B. It changes the state in attribute of the administrative state and the subordinate state with respect to the object for each communication path.

While FIG. 11 shows a case of a communication control system 100 for managing and controlling the entire communications network by the main network management system 80 and a plurality of sub-network management systems 81 to 83, it is also possible to constitute the communication control system by combining the functions of the main network management system 80 and the plurality of sub-network management systems 81 to 83 into one. This makes it easy to obtain a grasp of the state of the communication paths when managing the administrative state and subordinate state of the communication paths for each layer based on the status information collected from the communications network and performing various control such as path setting and path switching. Further, it makes it easy to manage the state of the communications network according to the control of the system 110.

As explained above, the present invention is designed to manage the state of control of the communication paths according to administrative state and subordinate state of each communication path in a communications network containing communication paths of client layers and communication paths of server layers. It changes the subordinate state of the communication paths of the client layer which is influenced by the content of control of other communication paths. The only processing changing the control state of the communication paths in the server layer is the processing up to that layer where the subordinate state has been already changed. Therefore, there is an advantage such that it becomes possible to shorten the processing time.

While the invention has been described by reference to specific embodiments chosen for purposes of illustration, it should be apparent that numerous modifications could be made thereto by those skilled in the art without departing from the basic concept and scope of the invention.

What is claimed is:

1. A method of controlling communication paths in a communication network comprised of communication paths of client layers and communication paths of server layers comprised of these communication paths arranged hierarchically, comprising a process of:

managing a state of control of the communication paths of a layer being controlled in terms of an administrative state and a subordinate state, which is influenced by the state of the communication paths of the server layer, independently from the administrative state, and changing the administrative state of the communication paths of the layer being controlled according to a control for setting and releasing the communication paths and changing the subordinate state of the communication paths of a client layer, which subordinate state is to be changed by the change of the administrative state of the communication path.

2. A method for controlling communication paths according to claim 1, further comprises a process of leaving the subordinate state of the communication paths in a client layer as it is and terminating the processing for control of the communication paths when the subordinate state of the communication paths of a client layer, which subordinate state is influenced by the control for setting and releasing the communication paths, has already been changed to the content which corresponds to the content of the administrative state of the communication paths in the server layer.

3. A method for controlling communication paths according to claim 1, wherein it further comprises a process of changing the administrative state of the communication paths to the locked state at the time of occurrence of a fault in the communication paths, terminating the processing for control of communication paths if the subordinate state of the communication paths of a client layer which is changed by the above change of the administrative state of the communication paths is the locked state, and changing the subordinate state to the locked state when not the locked state.

4. A method for controlling communication paths according to claim 1, wherein management of the administrative state and subordinate state of said communication paths is omitted for a layer for which the subordinate state does not have to be managed.

5. A communication control system for controlling a communications network comprising communication paths of client layers and communication paths of server layers comprising those communication paths arranged hierarchically, provided with a trail control function unit for managing the communication paths of each layer by the administrative state and subordinate state, changing the administrative state of the communication paths due to control for setting and releasing the communication paths of the layer being controlled, and changing the subordinate state of the communication paths of a client layer which is changed by the change of the administrative state of the communication paths.

6. A communication control system according to claim 5, further provided with:

a plurality of sub-network management systems for collecting status information and transferring control information with various equipment constituting the communication network and a main network management system for transferring the status information and control information with the plurality of sub-network management systems and having the trail control function unit in it.

7. A communication control system according to claim 6, wherein said main network management system and said plurality of sub-network management systems are connected via a communication corresponding unit through which the collection of said status information and transfer of said control information are carried out.

8. A communication control system according to claim 6, wherein said main network management system contains functional objects and information objects which are referred to by said trail control functional unit; each functional object is a data group required for controlling said communications network; and each information object is a data group required for managing the state of each communication path and the data group contains at least data for the communication trail, i.e., a trail object.

9. A communication control system according to claim 8, wherein said communication paths are managed by said trail object; and said administrative state and said subordinate state are managed as attributes of the trail object.

* * * * *